UNITED STATES PATENT OFFICE.

ROBERT EASTMAN, OF MEDIA, PENNSYLVANIA.

IMPROVEMENT IN COMPOSITIONS FOR SOAP.

Specification forming part of Letters Patent No. 118,440, dated August 29, 1871.

*To all whom it may concern:*

Be it known that I, ROBERT EASTMAN, of Media, in the county of Delaware and State of Pennsylvania, have invented an Improved Soap, of which the following is a description:

My soap is for cleaning tin, brass, iron, earthen and wooden ware, polishing marble and all metals, &c. It consists of the ingredients and the proportions hereinafter given, as follows, viz.:

To one thousand pounds of tallow add caustic soda sufficient to saponify the tallow; then add two hundred and fifty pounds resin, and sufficient lye to saponify the resin, when water enough is added to make the mass weigh about seven thousand pounds; then add from three and one-half to four parts of pulverized quartz to one part of the above mixture, and boil the whole in any suitable kettle or vessel until the proper consistency is had, after which it should be poured into frames, and cut into cakes or bars of any required length when cool.

The above-given proportions and quantities are taken from actual practice in the manufacture of my improved soap.

I claim—

A soap, composed of the ingredients and in about the proportions given.

ROBERT EASTMAN.

Witnesses:
    FRANCIS D. PASTORIUS,
    BENJAMIN BROOK.